Patented Jan. 2, 1951

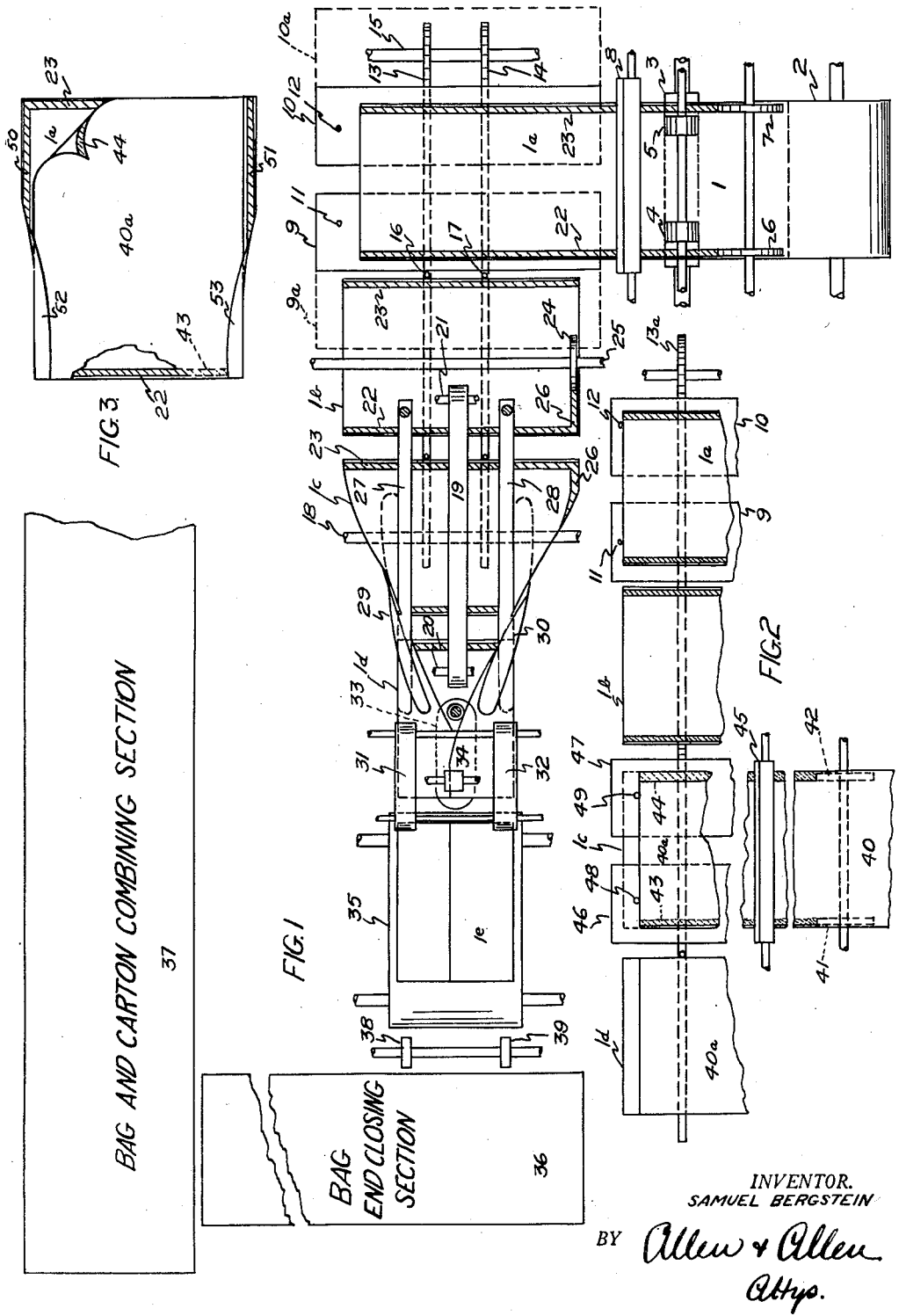

2,536,675

UNITED STATES PATENT OFFICE 2,536,675

METHOD AND MEANS OF MAKING BAGS

Samuel Bergstein, Cincinnati, Ohio, assignor to Robert Morris Bergstein and Frank David Bergstein, trustees Application May 7, 1945, Serial No. 592,362

3 Claims. (Cl. 93—18)

In the field of bag production, particularly in the smaller sized bags made from paper, cellulosic films and the like, it has become a frequent practice to provide a stripe of thermoplastic adhesive around the inner surface of the mouth of the bag, so that closure may be effected by the use of heat and pressure. In the usual production of such bags, a continuous web of the bag forming material is treated to provide a continuous series of spaced stripes of the thermoplastic adhesive transverse the web and transverse its direction of motion, as the web is drawn from a parent roll into the bag machine. The web of material is then formed into a continuous tube.

The stripes of adhesive are properly spaced in accordance with the length of the desired unit bag, and when the tube formed from the web is cut into bag-length sections, a stripe or area of thermoplastic adhesive is provided on the inner surface of the bag-length section. This is accomplished either by bisecting a wide stripe of adhesive or by cutting between adjacent narrow stripes in severing the bag tube. The bag-length section is thus ready for sealing. One end is usually heat sealed in the course of the bag making operation, the other end being sealed by the user after the bag has been filled.

The procedure I have described for making bags involves certain disadvantages. The imposition of the transverse stripes of thermoplastic adhesive on the web is accomplished with devices quite similar to printing equipment, the operation being essentially one of printing the stripes at intervals transverse the web except that a thermoplastic adhesive in molten form is used instead of ink, and the stripes or areas so applied chill or cool rapidly so that they are set before the web is tubed.

As a printing operation, however, the practice is inefficient. Thermoplastic adhesives in molten form, unlike inks, are stringy and have other characteristics which make them difficult to apply accurately and uniformly in narrow bands transverse a moving web by printing elements. There is the further problem of achieving accurate register between the spacing of the bands or stripes of thermoplastic and the subsequent cutting of the web into unit bag lengths. This is especially troublesome where the bags are relatively short in length, and where there is accordingly a greater frequency of occurrence of the transverse stripes or bands. Still another problem encountered in this practice is the difficulty of changing the machines from one bag length to another, due to the inherent mechanical problems encountered in adjusting registered, timed, printing or striping devices, cutting devices and the like, to new timed relationships.

It is an object of the present invention to overcome all of these difficulties and to provide a simple and effective means and method of assuring a uniform and accurately applied coating of thermoplastic on the desired end portions of the bag or tube. Another of my objects is the elimination of printing operations for the adhesive in bag production and the substitution of a continuous striping or coating operation. Yet another object is the elimination of the registry problem, and the problem of correlation of spaced stripes of adhesive on a continuous web with the unit bag length and with means for cutting the bag tube into unit lengths. Yet another object is the provision of methods and means whereby even the smallest and shortest bags may be run efficiently, and whereby changes from one bag length to another can be made with a minimum of time, labor and inconvenience.

These and other objects of my invention, which will be set forth hereinafter or will be apparent to one skilled in the art upon reading these specifications, I accomplish by that certain construction and arrangement of parts and in that procedure of which I shall now describe exemplary embodiments. Reference is made to the accompanying drawings wherein:

Figure 1 is a diagrammatic representation in plan of a bag making apparatus.

Figure 2 is a fragmentary and diagrammatic representation in plan of elements used in making two-piece bags.

Figure 3 is a diagrammatic representation of a two-piece bag.

In the practice of my invention all adhesive applied either for bag-tube-forming or bag closing operations is applied by longitudinal striping, thus avoiding printing mechanisms and methods.

The web of bag forming material, which may be paper or a laminated sheet or any ply of suitable flexible material, is withdrawn from a parent roll, and a stripe or narrow band of thermoplastic adhesive is applied to one or both edges of the web longitudinally. The web is chosen to have a width corresponding to the desired length of the finished bags, which is a reversal of current practice. It is, of course, both easy and inexpensive to form rolls of the desired width by slitting from wider rolls, as may be required, the length of the material in the roll being chosen in accordance with the size of the order or run involved.

The web, to which the longitudinal stripes of adhesive have been applied, is then severed into lengths determined by the desired width of the bags. It is to be noted that the length of the severed sections may be varied to give bags of different widths, but of the same length, from the same width of continuous web of bag forming material. The stripes of adhesive applied to the web will form the adhesive means for heat-sealing one or both ends of the ultimate bags.

The sheets having the stripe or stripes of adhesive adjacent their edges are now introduced into a second section of the machine, where they are caused to move in a direction transverse the movement of the bulk material. During this new movement a stripe of adhesive is applied to one or both edges. This again is a longitudinal striping operation, not a printing operation; but it results in the imposition of stripes transverse the first mentioned stripes. The purpose of the second mentioned stripe or stripes is that of enabling me to form a longitudinal seam or seams in the bag. During the second movement of the bag material, the individual sheets are tubed, and the longitudinal seam is formed.

Further operations may be performed upon the bag tube and upon the individual bag as hereinafter set forth.

Referring now to Figure 1, I have shown a web 1 of bag forming material being withdrawn from a web supply roll 2 in a first section of the machine. The web is drawn or carried forwardly by suitable means such as a pinch roll combination including a lower roll 3 and upper rolls 4 and 5 which are spaced inwardly of the material. As the material is moved, it is coated adjacent both its longitudinal edges, and in a continuous manner, with thermoplastic adhesive. I have shown a pair of application rollers 6 and 7 mounted upon a common shaft. It will be understood that these rollers are kept coated with thermoplastic adhesive from heated fountains of it by means of transfer mechanism. Roller coating devices for thermoplastics, and involving heated fountains, are known in the art and have not been detailed in my drawing. In my machine, when changing from one width of material to another, it is necessary in this section only to shift the lateral position of the roller coating mechanisms including shifting the application rollers 6 and 7 along their common shaft. The hot melt thermoplastic cools rapidly as the bag forming material carries it away from the application rollers, and very quickly assumes a non-tacky condition. A fly knife 8 or other suitable cut-off mechanism severs the striped continuous supply of bag forming material into sheets of the desired length. This is accomplished and adjusted by correlating the speed of the cut-off mechanism with the speed of the draw rolls 3, 4, 5.

Sheets of bag forming material are normally very flexible and limber, and I now have the problem of transferring them to a second section of the machine in which they will move at right angles to their first path of travel. Right angle machines are known in the carton industry; but the transfer mechanism involves rapidly revolving feed rolls which quickly whip the material into a position to be caught by pins on chains moving at right angles to the first section of the machine. This works very well for paperboard carton blanks in unfolded or partially folded condition. These blanks have great stiffness in proportion to their area. But in handling thin and flimsy sheets, transfer mechanisms of the known type are not advantageous.

I prefer to use a mechanism diagrammatically illustrated in Figure 1 and comprising a pair of plates 9 and 10 adapted to receive the sheet 1a. Pins 11 and 12 or other suitable abutment means are provided on the plates to position the sheet as it is delivered to them. The plates have a horizontal reciprocating movement toward and away from each other and can occupy either the positions shown in solid lines at 9 and 10 or the positions shown in dotted lines at 9a and 10a. When a sheet has been delivered to the plates and properly positioned thereon the plates are mechanically moved away from each other so as to permit the sheet to fall upon the bed of the machine at a level lower than the plates. This bed includes a suitable conveyor which may be a pair of chains 13 and 14 provided with the usual abutment pins and traveling in a direction at right angles to the initial movement of the bag forming material. These chains are shown operating over pinions on a shaft 15, at the right hand end of the machine. The sheet 1a is deposited on the lower bed of the machine in a position to be picked up by pins on the chains 13 and 14 and moved to the left in the figure. A second position of the sheet is shown at 1b where its rear or trailing edge is shown engaged by the pins or abutments 16, 17 on the chains.

The chains are shown returning about sprockets on a shaft 18, but not until the sheet has been delivered into engagement with frictional moving means contacting the sheet in its midsection. Various means may be employed for this purpose such as upper and lower conveyors with frictional engaging surfaces, series of driven rollers or the like. I have illustrated in the drawing an upper endless friction belt 19 passing around sprockets on shafts 20 and 21. It will be understood that one at least of these shafts is driven, that the lower flight of the belt 19 is kept in contact with the sheets either by a trackway or by a series of small rollers which act to maintain its position, and that beneath the belt 19 and the several bag forming sheets there will be another similar endless friction belt with driving means and means for holding its upper flight in contact with the sheets. The sheets are engaged between the belts and are moved along thereby.

The result of the striping operation at rollers 6 and 7 in the first section of the machine is the application of stripes of adhesive 22 and 23 to the longitudinal edges of the web. When the individual sheets are cut from the web and are moved off in the right angle direction by the mechanism above described, these stripes of adhesive lie transverse the direction of movement of the sheets as shown in the position 1b. During the movement of the sheets I apply another stripe of adhesive along one edge parallel to the direction of motion. This again is a striping operation, and I have shown an application roller 24 mounted upon a shaft 25 for the purpose. It will be understood that this roller is equipped with a heated fountain and transfer means. It applies a stripe of adhesive designated at 26.

In the second section of my machine I now perform a tubing operation. The sheets of bag forming material need not be scored nor weakened along the lines on which they are to be folded. I provide, to define the lines of fold, a pair of sword members 27 and 28. The sheets, gripped and moved forwardly by the frictional conveyor means described, are bent and folded over these swords. This may be accomplished by twist plates, twist belts or other suitable mechanism. I have indicated twist plates or folding sweeps in my machine at 29 and 30.

When the sheets have been folded or tubed the movement of them is taken over by other frictional mechanisms, now engaging the folded portions of the sheets and indicated at 31 and 32. The construction of these may be the same as that of the frictional conveyor 19; it will be understood that beneath belts 31 and 32 are other coacting frictional belts, and that the conveyors 31, 32 are so related to conveyor 19 as to insure a positive continuous movement of the sheets and folded tubes without buckling and without loss of control.

The swords 27, 28 terminate ahead of the friction conveyors 31, 32. Above the lower portion of the bag tube but below the folded portions I provide a plate 33 underlying the lap of the tube edges, and I seal the longitudinal seam of the bag tube by means of a driven roller 34 which will be heated, preferably by electrical means.

The nature of the folding operation will be clear from the drawing beginning with the unfolded sheet 1b, and showing at 1c and 1d sheets in partially folded condition, a completely tubed bag section being indicated at 1e. This completely tubed section may be delivered to a belt conveyor 35 by the frictional conveyors 31, 32.

If bag tube sections prepared for closure at either end are all that is required, the process may be stopped at this point and the bag tube sections collected as in a stacker and prepared for storage and shipment. But it is frequently desired not only to close the bag tube sections upon one end so as to form them into completed bags ready for filling, but also to combine the bags with cartons. In Patent No. 2,114,621 in the name of Robert M. Bergstein there is shown means for closing the ends of bag tubes, means for depositing the bag tubes upon and adhering them to carton blanks and means for tubing the carton blanks about the bags so as to form finished lined cartons. The mechanisms shown in that patent may be employed for these purposes upon bag tube sections formed in accordance with the present invention. Accordingly, I have merely indicated diagrammatically at 36 a machine section located at a right angle to the second of my machine sections and operating to close one end of each bag tube section. I have also indicated diagrammatically at 37 a machine for combining the bags with cartons, this machine forming a section at a right angle to the bag end closing section 36 but paralleling the second section of my machine. It may be noted that after the individual sheets of bag forming material have been tubed, a structure is produced which is smaller in area and sufficiently stiff in proportion to its area to permit transfer to the right angled section 36 by means of the usual speed-up roll transfer. I have indicated diagrammatically at 38 and 39 a speed-up roll combination operating to transfer the bag tube sections from the belt conveyor 35 to the machine section 36.

I have thus far described a method and mechanism for forming one-piece bag tube sections. Where the bags to be formed are quite large, the sheets for one-piece bags become very large also. It is advantageous under some circumstances to shift the operation to the manufacture of two-piece bags in order to avoid the handling of excessively large sheets. My apparatus and process work out very well in the manufacture of two-piece bags. In Figure 2 I have diagrammatically illustrated a portion of a machine section where the first sheet 1a is shown resting upon the transfer plates 9, 10 and positioned by the stops 11, 12 thereon. This sheet has been formed and striped with adhesive as hereinbefore described. When the plates 9, 10 are moved away from each other, it will be deposited upon the lower bed of the machine to be picked up and moved along by pins on chains one of which is indicated at 13a. A second position of the sheet 1a is indicated at 1b.

To form the second sheet of a two-piece bag I withdraw from a second roll or web supply of material a web 40 of the same width as the web 1. I apply in a similar fashion stripes of thermoplastic adhesive adjacent its lateral edges by means of application rollers 41 and 42 equipped with heated fountains and transfer means. It will be noted that the application rollers 41 and 42 are in this instance beneath the web 40 so as to apply the longitudinal stripes of adhesive 43, 44 to the underside of the web. The web is severed into sheets by means of a fly knife or other suitable apparatus 45; but the sheets formed from the web 40 are shorter in length than the sheets formed from web 1. The sheets 40a are delivered upon a second pair of plates 46 and 47 elevated above the bed of the second section of my machine. They come to rest against stop pins or abutment means 48, 49 which are inset from the longitudinal position of stop pins 11 and 12. Thus the sheet 40a is positioned above a sheet from the first supply in the position 1c, but the sheet 40a being shorter terminates inwardly of the edges of the first sheet.

When the plates 46 and 47 move away from each other, the sheet 40a is deposited upon the top of the first sheet and is also picked up by the pins on the chains, these pins acting as correlating means for the sheets in the direction of the length of the second section of my machine. I have shown the sheets superposed and in correlated position at 1d in Figure 2.

Either before or after the correlation of the sheets, thermoplastic adhesive is applied to the edges of the first sheet by means analogous to 24 in Figure 1. The operation of forming the bag tube unit involves thereafter the folding over of the projecting edges of the first sheet onto the edges of the second sheet, which is accomplished by means analogous to the folding means of Figure 1, together with the final heat sealing of both longitudinal seams. Reference to Figure 3 will show the nature of the two-piece bag, the under sheet being indicated at 1a and the upper sheet being indicated at 40a. Stripes of adhesive 22, 23 on the under sheet (applied in the first section) and stripes 43, 44 on the upper sheet (applied prior to the severance of the upper sheet) form the means whereby the bag tube unit may be closed by heat sealing on one or both ends after formation. The stripes of adhesive 50 and 51 on the sheet 1a were applied by longitudinal striping in the second section of my machine; and the folding over of the projecting side edges of the sheet 1a to form the completed bag tube unit is indicated in Figure 3 at 52 and 53. The longitudinal seams of the bag tube unit will, of course, be heat sealed by means analogous to the means 33, 34 hereinabove described in connection with Figure 1.

In my process the width of the web determines the length of the tube, as has been indicated. All adhesive applications are of the striping application variety, and occur longitudinally of the direction of motion of the web or of the sheets. The transfer mechanism which I have indicated works very well on thin and flimsy sheets. It is possible so to correlate the movement of plates 9 and 10 as to cause the trailing edge of the sheet to fall first. The abutment means on the plates 9 and 10 gauge the lateral position of the sheets in the first section of my machine, and the pins on the chains gauge its position longitudinally of the second section. By means such as those described, I have found that the tubing of unscored bag forming material in sheet form can be carried on very well and very accurately. It may be noted that the longitudinal and transverse stripes of adhesive may be caused to cross each other at the corners of the sheets giving a very positive seal and an ultimately hermetic result.

Modifications may be made in my invention without departing from the spirit of it. Having thus described my invention, what I claim as new and desire to secure by Letters Patent is:

1. A process of forming, from thin, flexible materials, two-piece bags closable at one or both ends by heat sealing which comprises withdrawing bag forming material from a web supply, forming by continuous coating means stripes of thermoplastic adhesive adjacent each longitudinal edge of the material so withdrawn, causing said stripes to set and become non-adhesive, severing the striped material into sheets, continuously moving said sheets in a direction at a right angle to the path of travel of the bulk supply, withdrawing other material from a second bulk supply parallel to the first supply and forming by continuous coating operations longitudinal stripes of thermoplastic adhesive adjacent each lateral edge thereof, severing said second bulk material into sheets of shorter length than the first mentioned sheets, correlating the first mentioned sheets and the second mentioned sheets in superposed position with the second mentioned sheets terminating inwardly of the edges of the first mentioned sheets, and with the adhesive areas of both sheets lying therebetween and next each other, applying adhesive by a continuous coating operation to the projecting side edges of the first mentioned sheets, folding said edges over onto edge portions of the second mentioned sheets, and forming longitudinal seams by heat sealing.

2. A process of forming, from thin flexible materials, two-piece bags closable at one or both ends by heat sealing which comprises withdrawing a web of bag forming material from a web supply, forming by continuous coating means stripes of thermoplastic adhesive adjacent each longitudinal edge of the material so withdrawn, causing said stripes to set and become non-adhesive, severing the striped material into sheets, depositing said sheets onto a separable platform, controlling the position of said sheets on said platform, separating the platform so as to deposit the sheets upon a conveyor means at a lower level and moving at right angles to the web, withdrawing a second web from a web supply parallel to the first supply, forming along at least one longitudinal edge by continuous coating means a stripe of thermoplastic adhesive on said second web, causing said stripe to set and become non-adhesive, severing said second web into sheets, moving said sheets onto a second separable platform, controlling the position of said sheets on said platform, separating the platform so as to deposit said sheets upon the previously deposited sheets on said conveyor means whereby both sets of sheets are carried along at a right angle to the movement of said webs, and in correlated position, one of said sheets having a greater dimension in a direction transverse to said conveyor and said sheets being so correlated that said last mentioned sheet projects at either side of said conveyor beyond the edges of the other sheet, applying adhesive in a continuous coating operation to the side edges of the said projecting sheet, folding its edges over onto edge portions of the other sheet, and forming longitudinal seams by heat sealing.

3. In a machine of the character described, means for withdrawing bag forming material from a web supply, means for continuously coating stripes of adhesive adjacent the side edges thereof, means for severing said web supply into individual sheets, a separable platform to which said sheets are delivered, means for locating said sheets on said platform, means for separating said platform so as to deposit said sheets to a lower level, a conveyor at said lower level for moving said sheets at a right angle to the direction of motion of said web material, means for withdrawing bag forming material from a second web supply parallel to the first supply, means for imposing longitudinal stripes of adhesive adjacent the lateral edges thereof, means for severing said web into individual sheets, a second separable platform on which said sheets are deposited, means for locating said sheets on said platform, means for separating said platform so as to deposit said sheets to the same lower level, said platform means being correlated so that the second mentioned sheets are deposited on the first mentioned sheets on said conveyor, frictional means for engaging the assembled sheets at their midsection and moving them along, means for applying to the then lateral edges of one of the sheets continuous stripes of thermoplastic adhesive, means for folding the edges of one of said sheets over onto the other of said sheets so as to form a bag tube structure and frictional means for gripping said folded sheets on folded portions thereof, coacting with means for forming longitudinal seams by heat sealing.

SAMUEL BERGSTEIN.

REFERENCES CITED

The following references are of record in the file of this patent:

UNITED STATES PATENTS

| Number | Name | Date |
|---|---|---|
| 537,566 | Dale | Apr. 16, 1895 |
| 738,778 | Cundall | Sept. 15, 1903 |
| 1,144,506 | Staude | June 29, 1915 |
| 1,851,061 | Poppe | Mar. 29, 1932 |
| 1,993,052 | Driver | Mar. 5, 1935 |
| 2,136,990 | Daller | Nov. 15, 1938 |
| 2,164,371 | Ajello | July 4, 1939 |
| 2,176,370 | Wagner | Oct. 17, 1939 |

FOREIGN PATENTS

| Number | Country | Date |
|---|---|---|
| 773,359 | France | Nov. 16, 1934 |
| 496,551 | Great Britain | Nov. 28, 1938 |